United States Patent [19]

Kamata et al.

[11] 4,322,150

[45] Mar. 30, 1982

[54] MECHANICAL MOUNTING SYSTEM FOR ZOOM OBJECTIVE

[75] Inventors: Shigeru Kamata; Takashi Isobe, both of Tokyo, Japan

[73] Assignee: Canon Kabushiki Kaisha, Tokyo, Japan

[21] Appl. No.: 173,182

[22] Filed: Jul. 28, 1980

[30] Foreign Application Priority Data

Jul. 30, 1979 [JP] Japan ................................ 54-97766
Aug. 27, 1979 [JP] Japan ............................... 54-108911

[51] Int. Cl.³ ........................ G02B 7/10; G03B 13/02
[52] U.S. Cl. .................................... 354/195; 350/255
[58] Field of Search ................. 354/286, 195, 196; 350/255, 430

[56] References Cited

U.S. PATENT DOCUMENTS

| | | | |
|---|---|---|---|
| 3,163,701 | 12/1964 | Staubach | 350/255 X |
| 3,731,987 | 5/1973 | Jida et al. | 350/255 X |
| 3,850,507 | 11/1974 | Uesugi | 350/255 X |
| 3,862,797 | 1/1975 | Uesugi | 350/255 |
| 3,891,310 | 6/1975 | Hideo et al. | 350/255 X |
| 3,915,557 | 10/1975 | Shimojima | 350/255 X |
| 4,089,590 | 5/1978 | Sakata | 350/255 X |
| 4,168,884 | 9/1979 | Tesch | 350/255 X |

*Primary Examiner*—Donald A. Griffin
*Attorney, Agent, or Firm*—Toren, McGeady & Stanger

[57] ABSTRACT

A mechanical mounting system for a zoom objective having provision for close-up operation includes an actuator serving to perform both focusing and zooming operations as it is turned and axially moved respectively. When the actuator is axially moved to the wide angle position and when it is turned to the lower limit of the focusing range, a drive connection between the actuator and a camming cylinder for the zoom and close-up control is established even in the transverse direction. Upon transverse movement of the actuator beyond the focusing range, the camming cylinder is turned to axially move the variator forwardly while the compensator remains stationary in the wide angle position thereby effecting a close-up operation.

8 Claims, 22 Drawing Figures

MECHANICAL MOUNTING SYSTEM FOR ZOOM OBJECTIVE

The present invention relates generally to photographic lens devices and more particularly to zoom lens assemblies wherein provision is made for a close-up mechanism therein.

In the prior art, a wide variety of mechanical mounting systems for zoom lenses having close-up capability have been proposed. An example of such a system is disclosed in U.S. Pat. No. 4,097,124 wherein in the mounting for the zoom lens focusing and close-up operation are performed by a common actuator 13 of the zoom control which is rotated about the optical axis of the lens assembly or moved axially, respectively. When it is desired to select operation in the close-up range, the operator must however rotate a mode ring 18 so that engagement of a pin 30 in a slot is changed from a zoom control slot Z1 to a macro-control slot M1. That is, in the mechanical mounting system of this prior art reference, the zooming operation and the close-up operation are entirely independent of each other and their exists no consecutive relationship therebetween. Of course, it will be apparent that the type of zoom lens assembly described in this reference is meritorious in that accidental changeover of the optical system to the close-up range when zooming is being performed may be prevented.

In this context it should be considered that the usefulness of a zoom lens may be enhanced if the action of focusing a lens assembly upon an object to be photographed may be followed by a series of actuations of the shutter release mechanism with different magnifications of an image of the object as desired. Furthermore, the manageability and convenience of the lens assembly will be improved also when focusing operation, zooming operation and close-up operation may be performed consecutively relative to each other by a single actuating member.

Since, in conventional zooming systems, the total axial movement of the actuator member must be equal to that of the variator, the longitudinal length of the mounting unit must be considerably increased thereby sacrificing ease of handling and portability of the device.

A further more serious problem will be encountered when total axial movement of the variator is increased since it is difficult to hold the variator truly normal to the tubular body of the lens assembly during its entire excursion. Thus, the fitting accuracy of the movable lens cell in the tubular body of the assembly must be increased. This tends to lead to requirements for supplying high-precision mechanical parts and for employing much more delicate assembly techniques.

With regard to the zoom control mechanism, it has been common practice in the prior art, as disclosed for example in U.S. Pat. No. 4,097,924, that the variator and the compensator are fixedly carried by respective movable sleeves which are arranged in a superimposed relationship relative to each other. It is therefore of great importance that the dimensions of the sleeves be limited to very close tolerances and the assembly procedure particularly with regard to the fitting adjustment must be so fine that there can be no looseness or play between the sleeve and the tubular body of the assembly while insuring smooth operation of the control mechanism. This will contribute to an increase in the production costs of the system.

In view of the foregoing, the present invention is directed toward provision of a mechanical mounting system for a zoom objective having three ranges of zooming, focusing and close-up operation selectively rendered by only one actuator sleeve without requiring recourse to selector means.

A further aim of the invention is to provide a mounting system for a zoom objective having a close-up mechanism operating with a common actuator for zooming and for focusing in such a manner that the three operations may be formed consecutively.

A further goal of the invention is the provision of a zoom lens assembly characterized by high accuracy while limiting to a minimum deviation of the points of positioning of each individual moving part from prescribed ideal positions as the magnification varying lens holder and the image shift compensating lens holder are moved along a common optical axis. A further aim of the invention is to provide a novel zoom control mechanism having a shorter total axial movement of the actuator than that of the variator and to provide a zoom objective having improved manageability and portability.

SUMMARY OF THE INVENTION

In accordance with the present invention, a zoom lens assembly is provided wherein a single actuator ring is arranged in the mechanical mounting system to effect zooming operation upon axial movement thereof and upon rotative movement thereof about the optical axis to effect close-up operation whereby the transition from the axial to the rotative phase of movement may be caused to occur only after passage of the wide-angle end. In the assembly of the invention, means are provided for preventing accidental selection of the close-up range which would otherwise occur when the actuator nears the wide angle end of movement thereof. Utilization of such means makes it possible to eliminate the drawback that the sharp focus condition will be broken after the close-up range is selected.

In order to achieve high accuracy of zoom control, there is provided in accordance with another feature of the invention a novel and improved differentiating mechanism for the variator and the compensator mounting members which is also adapted for suitable use in axial movement of the variator independently of the compensator which remains stationery in the wide angle position when a close-up operation is being performed.

The most characteristic feature of the invention resides in the fact that in order to enable an operator to perform zooming and close-up operations consecutively, i.e. without having to remove his hand from the actuator member, an intermediate member is provided causing axial movement of the actuator to effect zooming operation and causing rotative movement thereof about the optical axis to effect close-up operation with a detent mechanism being provided for bringing and taking this intermediate member into and out of drive connection with the actuator member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 12 being a perspective view of the main parts of the changeover mechanism, and FIGS. 13 and 14 being sectional views of the mechanism shown in two operative positions;

DESCRIPTION OF THE PREFERRED EMBODIMENTS

Figure 1:
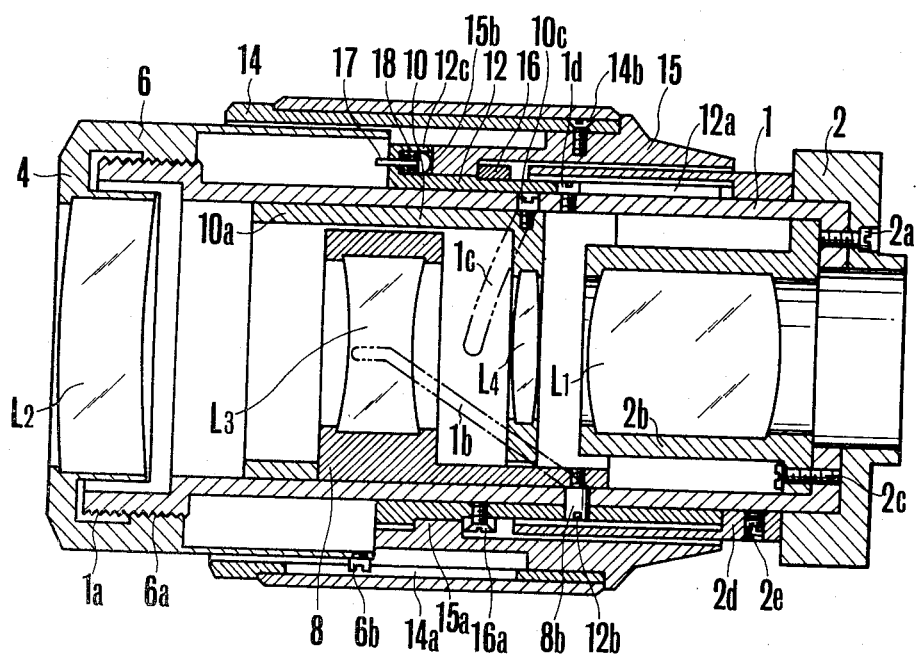
FIG. 1 is an axial sectional view of one embodiment of a lens assembly in accordance with the present invention.

Referring now to the drawings, wherein similar parts are identified with like reference numerals throughout the various figures thereof, the present invention is shown in various embodiments by application thereof to interchangeable lens mounting systems for single lens reflex cameras.

The lens mounting assembly of the invention includes a tubular body 1 and an adapter 2 which is fixedly mounted at the rear end of the tubular body by means of screw fasteners 2a. The adapter 2 is equipped with coupling means to enable attachment of the lens assembly to a camera body (not shown).

A relay lens group L1 is held within the tubular body. A screw fastener 2c is provided for fixing a cell member 2b containing the first lens group L1 to the tubular body 1. At the other end of the tubular body 1 there is shown a front barrel member 6 coupled in unison with a cell 4 containing a second lens group L2 which is movable for effecting the focusing of the lens assembly. The cell 4 and the tubular body 1 are in threaded engagement with each other by means of helicoid portions 1a and 6a. A relay sleeve 2d has thereon a distance scale and is fixedly mounted on the tubular body 1 by a screw 2e.

Figure 2:
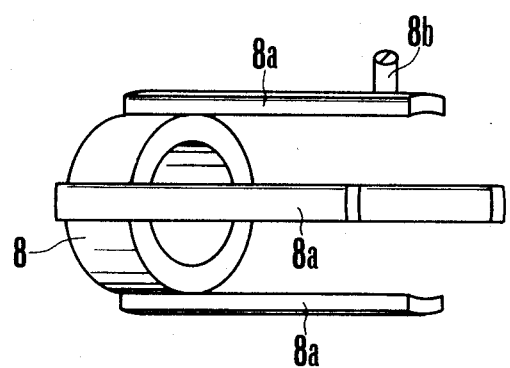
FIG. 2 is a prospective view of a variator mounting member of the assembly of FIG. 1.
Figure 3:
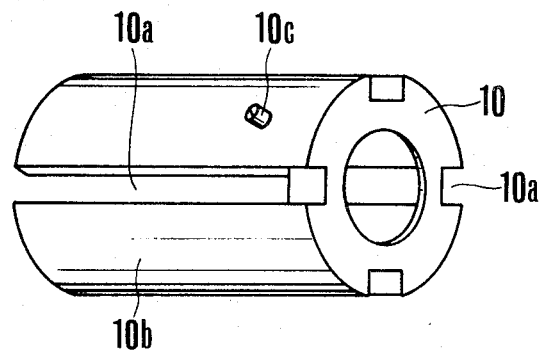
FIG. 3 is a perspective view of a compensator mounting member of the assembly of FIG. 1.

Lens holder members 8 and 10, shown in FIGS. 2 and 3, respectively, containing a magnification varying lens group L3 and an image shift compensating lens group L4, respectively, are movably fitted in the inner diameter of the tubular body 1. The holder 8 of the third lens group L3 is formed with four longitudinally elongated arms 8a which are slideably fitted in respective recesses 10a of the holder 10 of the fourth lens group L4.

Figure 4:
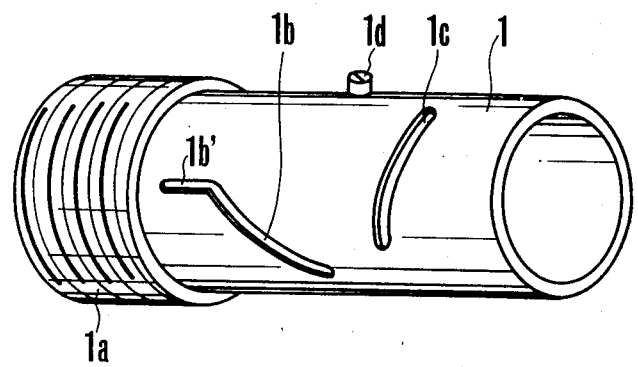
FIG. 4 is a perspective view of a tubular body of the assembly of FIG. 1 having provided thereon guide means and pin means operating as an engaging device.

Guide pins 8b and 10c arranged, respectively, on the holders 8 and 10 are engaged in respective slots 1b and 1c provided through the wall of the tubular body 1, as shown in FIG. 4, to control movement of the variator L3 and the compensator L4.

Figure 5:
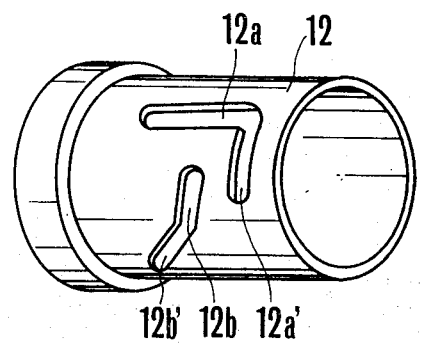
FIG. 5 is a perspective view of a cam sleeve or intermediate member of the assembly arranged between the tubular body shown in FIG. 4 and an operational member of the lens assembly of FIG. 1 and provided with longitudinal guide means for axial movement of the operational member, with transverse guide means and with variator guides for the zooming and close-up regions, respectively.

Movably fitted on the outer diameter of the tubular body 1 is a cam sleeve 12, shown in FIG. 5, having a first cam slot 12a with a longitudinal orientation and a second cam slot 12a' having a transverse orientation. Third and fourth cam slots 12b and 12b' are also provided in the sleeve 12. In the first cam slot 12a there is engaged the guide pin 1d mounted on the tubular body 1. In the other cam slot 12b there is engaged the guide pin 8b which extends radially from the lens holder 8 through the cam slot 1b of the tubular body 1 (see FIG. 1).

An actuating member 14 is fitted on the outer diameter of the lens barrel and it is provided with a longitudinal groove 14a into which the pin 6b of the front barrel member 6 enters. Axial movement of the actuator 14 leaves the second lens group L3 stationery in its position. On the other hand, rotative movement about the optical axis causes axial movement of the front barrel 6 through the helicoid connection 1a, 6a.

An interlocking sleeve 15 is inserted into a space between the actuator 14 and the cam sleeve 12 and is fixedly secured to the actuator 14 by a fastener screw 14b. The interlocking sleeve 15 has an inner integral flange formed in a front end portion 15a thereof and arranged between an outward flange 12c of the cam sleeve 12 and a ring 16 which is fixedly fitted on the sleeve 12 so that the interlocking sleeve 15 is rotatable relative to the cam sleeve 12 while being restrained from axial movement.

Figure 9:
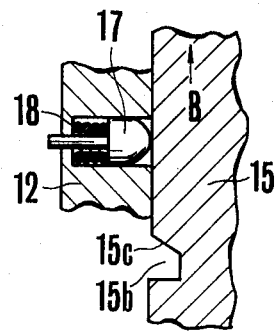
FIGS. 9 and 10 are partial sectional views of a detent mechanism for a drive connection between the operational member and the cam sleeve shown in the idle and the active positions, respectively.
Figure 10:
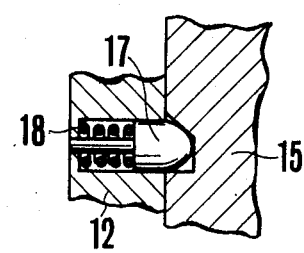

As best seen in FIGS. 9 and 10, a pin 17 and a spring 18 are arranged to constitute a locking means together with a detent hole 15b for simultaneous rotation of the actuator 14, the interlocking sleeve 15 and the cam sleeve 12 in predetermined positions (the close-up positions). The pin 17 is movably fitted in a hole provided in the wall of a flange at the front end of the cam sleeve 12 and it is pressed by the spring 18 against the radial shoulder of the interlocking sleeve 15, the arrangement being such that when the actuator 14 is turned beyond the normal focusing range toward the close-up operating range, the pin 17 will enter the detent hole 15b and thereby a drive connection will be established between the actuator ring 14 and the cam member 12.

In the operation of the embodiment of the mounting mechanism for the zoom objective of the present invention depicted in FIGS. 1-8, when the actuator member 14 is moved axially, since the interlocking sleeve 15 is clamped between the ring member 16 and the radial flange of the cam member 12, the actuator 14, the interlocking sleeve 15 and the cam member 12 will be moved axially as a unit. The total axial movement of the actuating member will be defined by the longitudinal length of the path of possible relative movement of the pin 1d on the tubular body 1 in the first cam slot 12a of the cam member 12.

Figure 6:
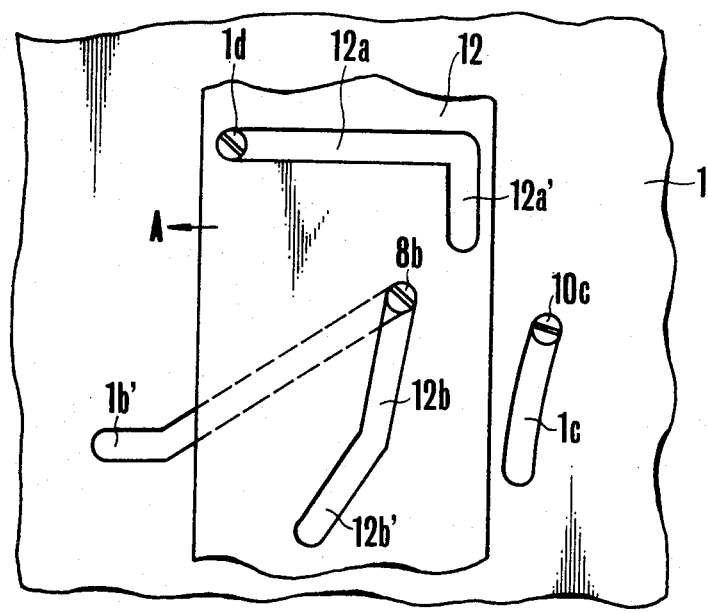
FIGS. 6-8 are developed representations of the tubular body and the cam sleeve with the engaging means of the variator and compensator holders assuming the telephoto, wide angle and close-up positions relative to the guide slots, respectively.
Figure 7:
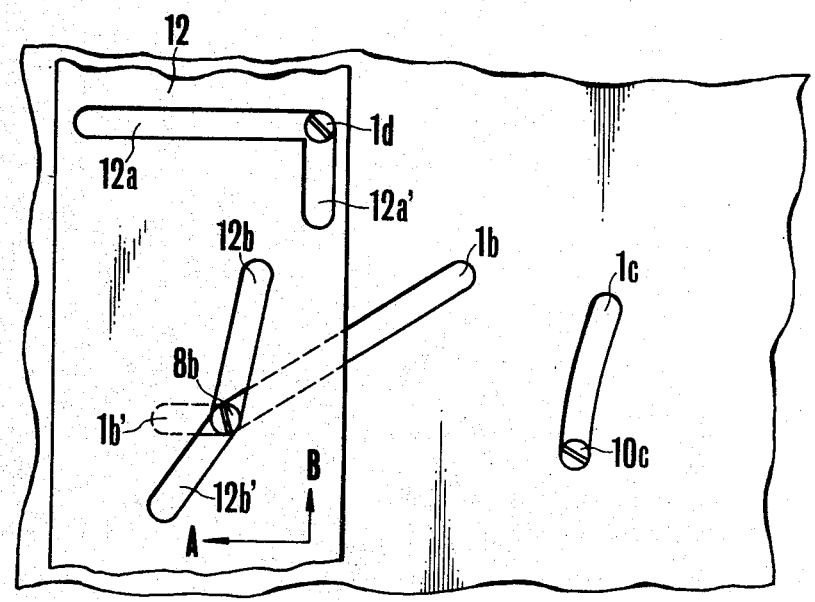
Figure 8:
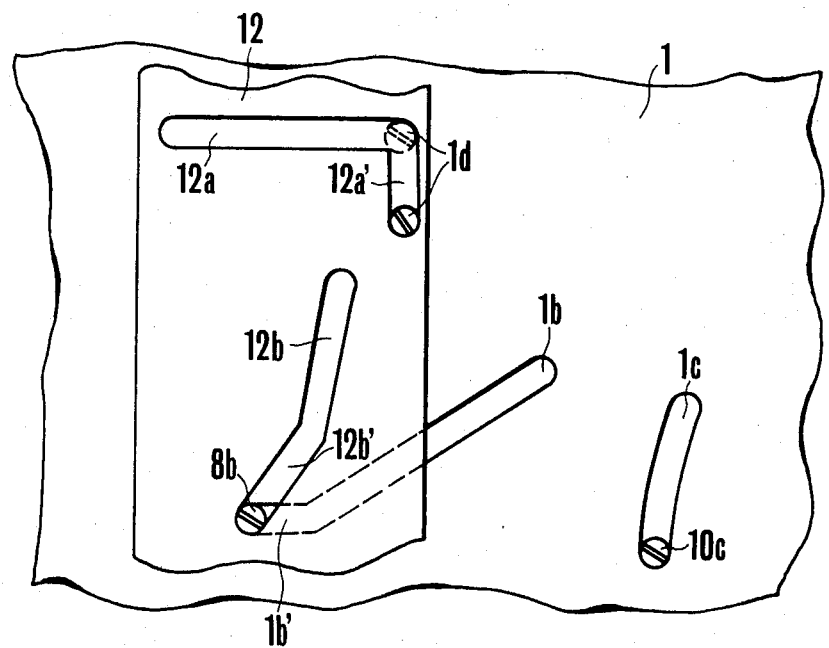

As the actuator member 14 is axially moved from the telephoto position shown in FIG. 6 to the wide angle position of FIG. 7, with the cam sleeve 12 being simultaneously axially moved and guided by the pin and slot connection 1d, 12a, the third lens group or variator L3 is axially and rotatably moved toward the front of the assembly by the pin 8b extending through both slots 1b and 12b in the tubular body 1 and the cam sleeve 12, respectively. At the same time, the rotative component of motion of the variator lens cell 8 is transmitted through the elongated arms/fitted slots connection 8a, 10a of FIGS. 2 and 3 to the compensator lens cell 10 whereby the latter is caused to move axially toward the front of the assembly guided by the pin 10c engaging in the slot 1c.

It should be noted that in this embodiment, the lens holding members 8 and 10 are axially elongated in order to slideably engage with each other over the entire zooming range. Also, the armed portions 8a and the slotted portions 10a are maintained in overall surface contact with each other with the lens holding members 8 and 10 fitted in the common inner diameter of the tubular body 1. Therefore, it is possible to hold the variator and the comparator in a truly normal position relative to the common optical axis during the entire range of movement thereof. It is also possible to avoid the existence of play between the lens holders and the tubular body while still permitting a smooth axial movement of the individual lens holders 8 and 10. Furthermore, the motion of the member 8 may be transmitted to the member 10 with a relatively small amount of force.

When the actuating member 14 is rotated about the optical axis, motion of the actuating member 14 is transmitted through the pin/axial slot connection 6b, 14a in order to turn the front barrel 6 while simultaneously causing the barrel 6 to move axially by virtue of the helicoid coupling 6a, 1a thus moving the second group L2 in order to effect focusing to accommodate differing object positions.

It is noted that when in the focusing mode of operation, the third and the fourth lens groups L3 and L4 will remain stationary since, although the interlocking sleeve 15 is clamped by the cam member 12 and the restraining member 16, it is rotatable so as not to transmit the driving torque of the actuating member 14 to the cam sleeve 12 and the lens holders 8 and 10.

It is further noted that in this embodiment it is necessary to provide stopper means arranged between the interlocking sleeve 15 and the cam member 12 to enable focusing to be performed at any zooming station. This will be more fully explained hereinafter in connection with a further embodiment of the invention.

Since the linearly advancing operation of the actuator member 14 contributes only to movement of the cam sleeve 12 cooperative with the one cam follower pin 8b on the variator holder 8, and since the pin 8d always occupies the intersection of the lead slot 1b and the second cam slot 12b, of which the latter is inclined with respect to the optical axis, the variator holder 8 will move axially at a faster rate than that of the actuator 14. As a result, the total axial movement of the actuating member 14 may be made shorter than that of the variator holder 8. The relationship between the amounts of movement of the actuator 14 and the lens holder 8 may be termed an accelerating relationship.

As a result of this accelerating function, it is possible to employ an increased range of variation of image magnification for an equivalent amount of movement of the actuator 14. That is, the actuator may be shortened in the longitudinal direction to effect a zooming function equivalent to that provided by conventional devices.

In order to operate the lens assembly of the invention for close-up photography, the operator may first move the actuator 14 forwardly from the telephoto position to the wide angle position where the pin 1d on the tubular body 1 lies in the rear end of the longitudinal slot 12a and is aligned to the transverse slot 12a' to permit rotative movement of the cam sleeve 12. As the actuating member 14 assumes an intermediate focusing position where the detent hole 15b is out of alignment with the pin 17, when the actuating member 14 is turned to the lower limit of the normal focusing range, the interlocking sleeve 15 will be drivingly connected to the cam sleeve 12 by the pin 17 engaging in the detent hole, as shown in FIG. 10, and thus there will be completed the selection of the close-up range.

As the actuator member 14 is further rotated, the third lens group L3 is moved forwardly without the accompaniment of any rotative movement because of the guidance of the pin 8b by the axial slot 1b'. Therefore, the fourth lens group L4 is maintained stationery in the same position when in the wide angle setting during close-up operation.

Thereafter, when the actuating member 14 and the interlocking sleeve 15 are to be returned from the close-up range to the zooming range, the actuating member 14 is turned in the direction opposite to that indicated by the arrow B to move the detent hole 15b away from the pin 17 as the hemispheric head of the pin 17 is slideably moved on the tapered surface 15c against the force of the spring 18 so that the interlocking sleeve 15 is then disconnected from the cam sleeve. The pin 1d returns from the solid-line position to the dashed-line position shown in FIG. 8 and thus the zooming range is rendered operative.

It will be seen from the foregoing that the present invention provides for the fixed sleeve 1 having the cammed portions 1b and 1c controlling movement of the optical lenses L3, L4 which contributes to change of the image magnification and image shift compensation. Only one operating member in the form of an outer sleeve on the fixed sleeve 1 is sufficient to effect zooming, focusing and close-up operation selectively. For this purpose, the camming member 12 is arranged to cooperate with the operating member 14 and it is formed with cammed portions 12a', 12b and 12b' controlling the transition to and the adjustment of the closeup range. Furthermore, there is provided interlocking means 15c, 17 and 18 for placing the operating member into and out of drive connection with the cam member 12. When it is desired to shift the operating member 14 from one range to another, the interlocking means is rendered either effective or ineffective in order to make it possible for zooming, focusing and close-up adjustments to be consecutively performed.

With this construction and arrangement, the features of the present invention may be embodied in a fixed sleeve 1, a cam sleeve 12, operating member 14 and lenses L2, L3 and L4 alone. Thus, a relatively simple structure may be provided for the mounting mechanism.

The present invention has been described in connection with the embodiment of FIGS. 1–8 as applied to a four-component zoom objective with a focusing lens, variator, compensator and relay lens. However, it should be understood that the invention is applicable to a three-component zoom objective with the exclusion of the relay lens. Further, the invention is described in the form of an interchangeable lens assembly as an example of an embodiment thereof but it should be understood that it is applicable to a built-in zoom lens assembly for photographic instruments.

Figure 11:
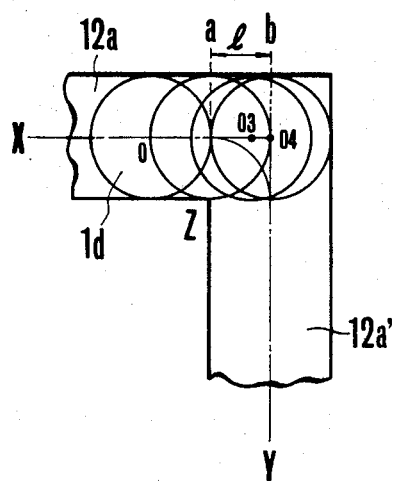
FIGS. 11-14 show an example of an improvement in the lens assembly of FIGS. 1-10 with a mechanism for assuring occurrence of a transition from the zooming to the close-up position past the wide angle end, with FIG. 11 being a schematic diagram showing the normal and erroneous paths of movement of the engaging means of the tubular body in the contiguous guide slot means.

FIGS. 11–15 show an example of improvements in the first embodiment previously described herein. Since in the embodiment of FIGS. 1–10, the direction of movement of the actuator is changed through a right angle as a transition occurs between the zooming and the close-up ranges, and since the pin 1d engaging in the slots 12a, 12a' is round in cross-sectional configuration, a looseness or play is produced when the pin 1d enters the corner of the slots 12a and 12a' as shown in FIG. 11. Because of this there exists a rather high possibility that there will occur abnormal transition particularly when the zooming range is exchanged for the close-up range.

FIG. 11 shows two extreme paths of movement of the pin 1d as it is guided by the slots 12a and 12a', one of which is indicated by perpendicularly crossed lines X and Y and considered to be normal, and the other of which is indicated by the curved line Z. In the latter connection it should be explained that the actuator 14 may change its movement from the axial direction to the transverse direction when it reaches a point at a distance equal one-half of the width of the slot 12a' ahead of the wide angle position. In other words, the actuator 14 while having already entered the close-up range may be further moved axially forwardly to effect the balance of the zooming function. This gives rise to a problem in that as zooming is being performed in the close-up range it becomes difficult to perform a focusing adjustment for close-ups.

Figure 12:
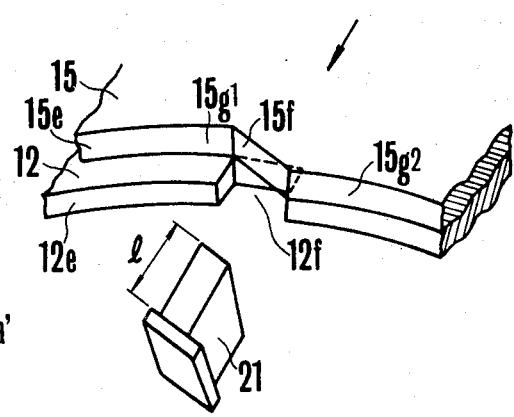
Figure 13:
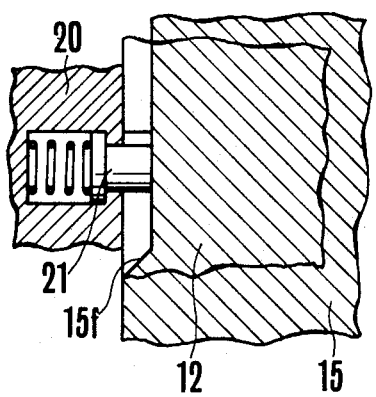
Figure 14:
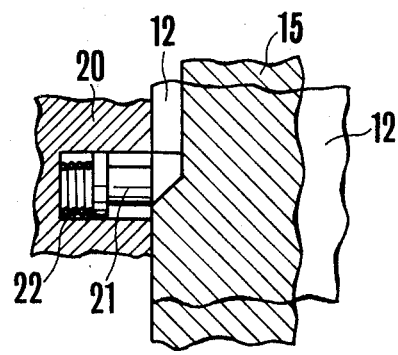
Figure 15:
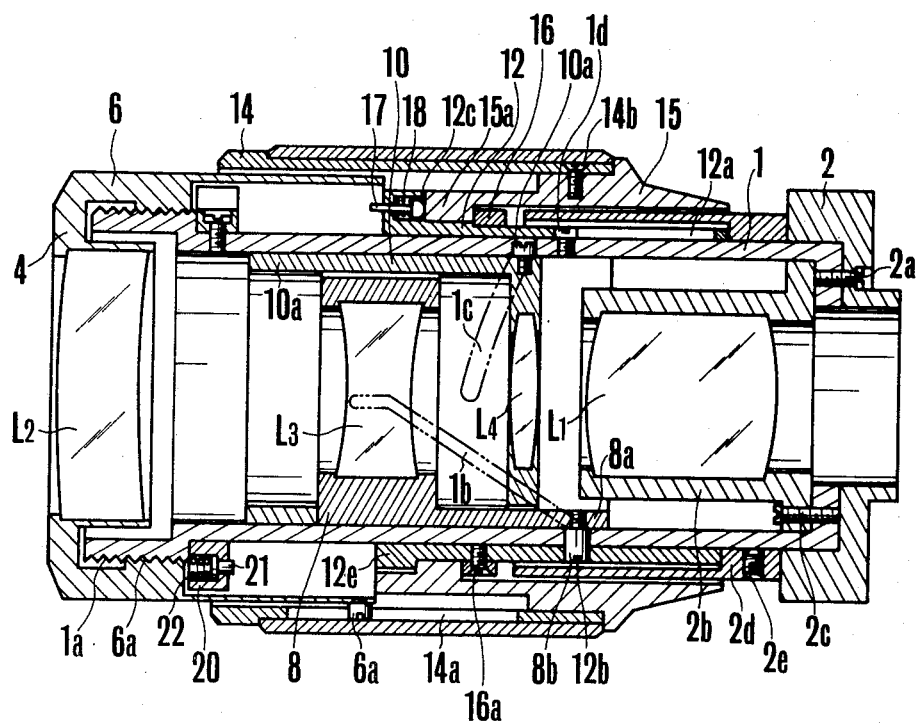
FIG. 15 is a longitudinal sectional view of a lens assembly provided with the changeover mechanism of FIGS. 11-14.

FIGS. 12–14 show an example of a mechanism to overcome this drawback. In FIG. 12, the same reference numerals are utilized to denote similar parts as those depicted in FIGS. 1–10. As is also shown in FIG. 15, the tubular body 1 is provided with sensing means 20, 21, 22 at the forward part thereof. The sensing means is arranged in axial alignment with the front ends of the overlapped cam sleeve 12 and interlocking sleeve 15 so that the position of the actuator 14 in the axial direction may be sensed. The sensing means comprises the ring member 20 fixedly mounted on the tubular body 1 and having a hole or groove in which a flanged pin 21 is movably fitted with a spring 22 urging the pin 21 to project outwardly of the ring 20 toward the cam and interlocking sleeves 12 and 15.

The cam sleeve 12 is provided with a cut-out 12f formed in a front end portion thereof and arranged in alignment with the projected portion of the pin 21 of the sensing means. The front end surface 15e of the interlocking sleeve 15 is also configured with a slope 15f radially aligned with the cut-out 12f intervening between axially differentiated stages 15g1 and 15g2.

With the mechanism described, as the actuator 14 is moved forwardly when it reaches the wide angle position the projected portion of the pin 21 will be pushed into the hole or groove by the action of the tapered surface 15f of the interlocking sleeve 15. Assuming a situation before the actuator 14 has been moved forwardly through the full range to the wide angle position, i.e. after having been stopped at a position within a range of distances of from a to b as shown in FIG. 11, if the actuator is turned about the optical axis then the projected portion of the pin 21 engages the cut-out 12f to hinder further movement of the actuator 14. That is, as shown in FIG. 13, although the center of the pin 1d lies at a point $O_3$ in the range of a to b in FIG. 11 in order to permit transverse movement of the actuator 14, the pin 21 will be allowed to enter the cut-out 12f so that the actuator 14 cannot be fully turned. Then when the actuator 14 is turned in a reverse direction and followed with actual movement to the wide angle end, the pin 21 is pushed by the tapered surface 15f of the interlocking sleeve 15 against the force of the spring 22 thereby being disengaged from the cut-out 12f to permit the full range of close-up operation.

FIGS. 16–22 show another embodiment of the change-over mechanism for selection of the zooming and close-up ranges. In this embodiment, the variator and the compensator holders are of different construction from that shown in FIGS. 2 and 3.

The intermediate or cam member 12 is not only provided with the guide slots 12a, 12a', 12b, 12b' but it is also provided with a new guide slot 12c into which a pin 10c on the compensator holder 10 will extend through the guide slot 1c of the tubular body 1. The guide slot 12c is arranged contiguously to a transverse guide slot 12c'.

On the other hand, the variator and compensator holders are modified so that the arms and the open slots are not in surface contact with each other. That is, the armed portions 8a although lying in the respective cut-outs 10' formed in the portions of the compensator holder 10 are arranged so as not to constitute the motion transmitting intermediary as the cut-outs 10' are over-slotted. With this construction, axial movement of the compensator is controlled by the pin 10c engaging in the guide slots 12c and 1c. The two methods of axially moving the compensator holder 10, 10' each have advantages and disadvantages and the selection of either one of the methods may be optional depending upon the type of mechanical mounting involved.

Referring now to the axial sectional view of FIG. 15, it is noted that the operating means (the actuator 14 and the inner sleeve 15 contiguous thereto) and the cam sleeve 12 are maintained in threaded relationship with a short pitch. The device includes a diaphragm unit 22 carried by the fixed support member 26, a diaphragm presetting ring 23 and a signal transmitting member 24, these parts constituting a mechanism of known construction in the art whose detailed explanation is therefore omitted. In FIGS. 16–22, a spring member 25, an interconnecting plate 26 and a cut-out 15h of the cam sleeve 15 constitute an interlocking mechanism for the operating means and the cam member when in the close-up range. The spring member 25 is affixed to the cam member 12 at one end, i.e. the front side thereof, by means of screws and the interconnecting plate 26 is affixed to the tubular body 1 also at one end, i.e. the object side, by means of screws.

The free end of the spring member 25 is formed with an outwardly folded portion 25a which has a spring property so that when the axial movement of the actuating member 14 (15) to the wide angle position is followed by rotative movement about the optical axis, the actuating member 14 and the cam member 12 will be connected to each other and will be simultaneously rotated about the optical axis in order to effect close-up operation guided by the pin 1d on the tubular body 1 engaging in the transverse slot 12a' of the cam sleeve 12.

Figure 20:
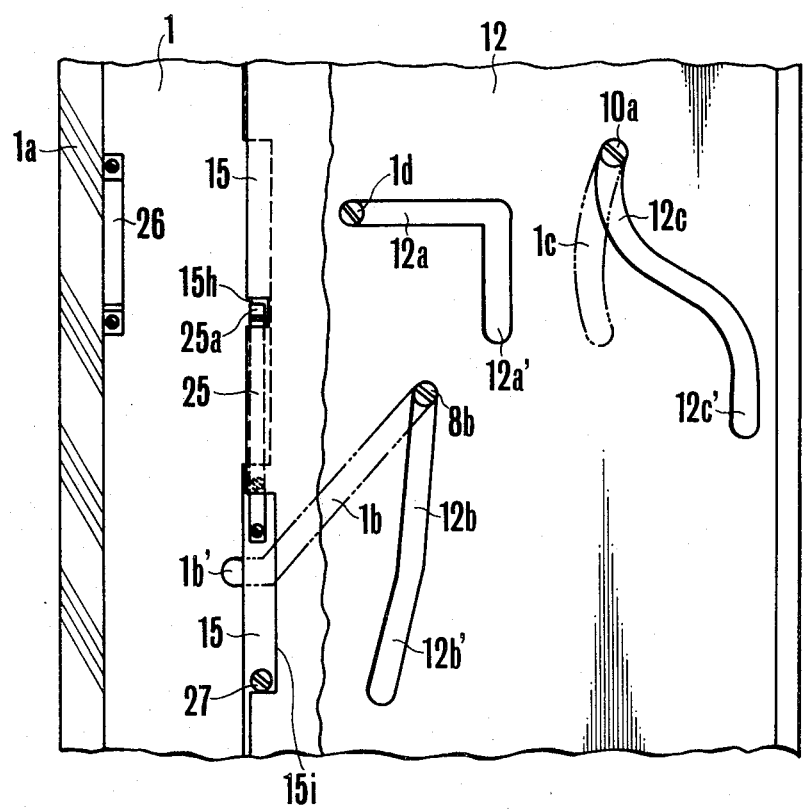
FIGS. 20-22 are developed representations showing the main parts for purposes of depicting the detent mechanism of this embodiment.
Figure 21:
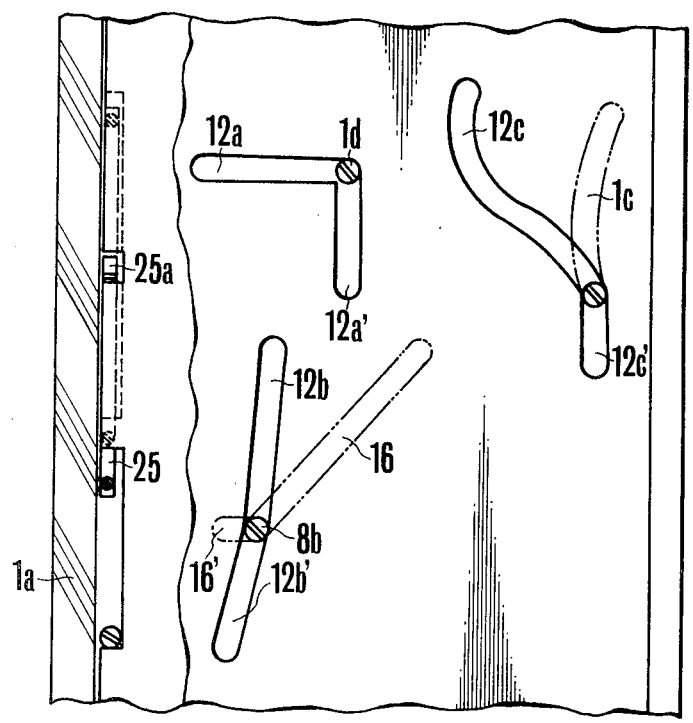
Figure 22:
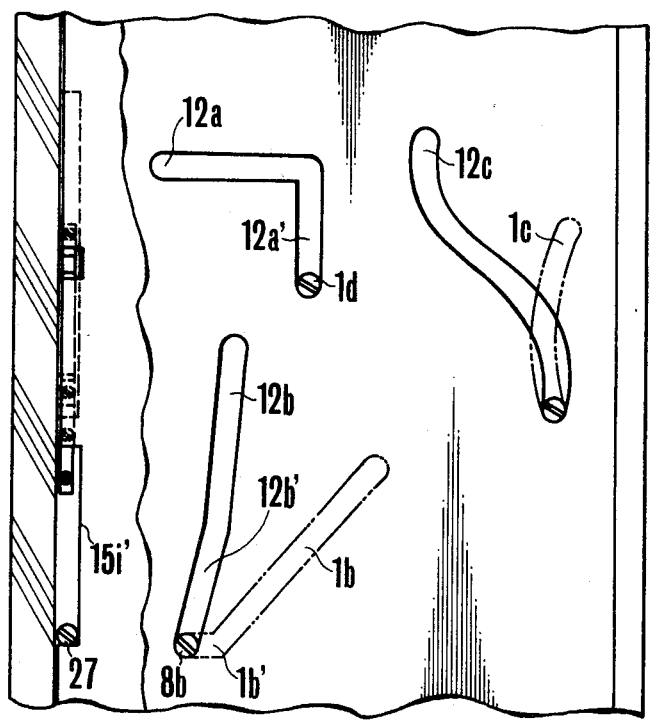

With reference to FIGS. 20–22, this connecting operation is explained with greater detail and FIG. 20 is a developed view of the tubular body 1 and the cam member 12 with the actuating member 14 in the telephoto position showing an arrangement of the various parts constituting the interlocking mechanism. In this state, the free end 25a of the spring member 25 is seated in the cut-out 15h formed in an end portion of the cam member 15.

Figure 16:
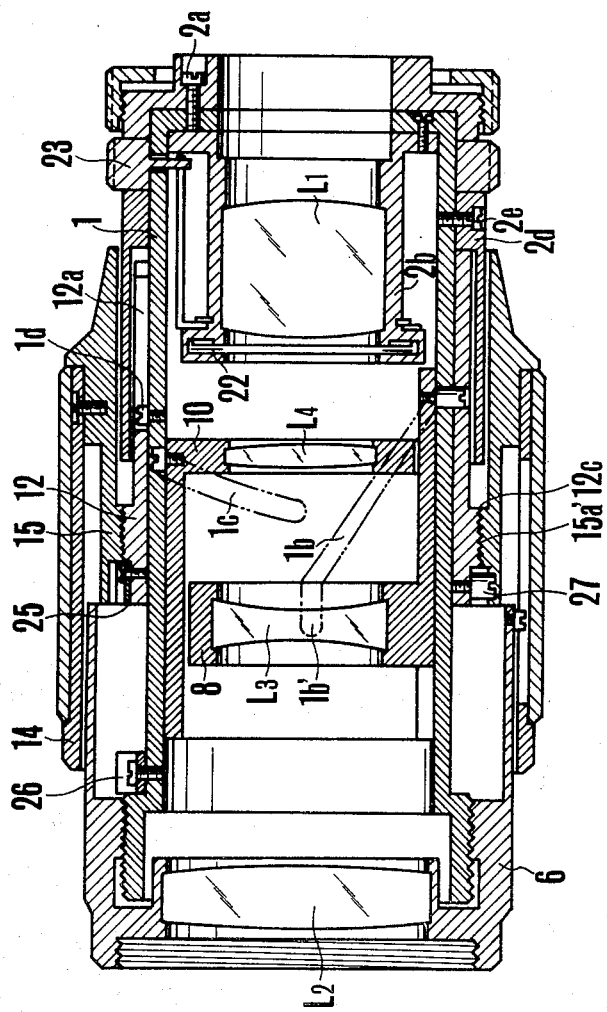
FIG. 16 is a longitudinal sectional view of a lens assembly comprising another embodiment of the invention including a detent mechanism between the actuator member and the cam sleeve in the close-up position.
Figure 17:
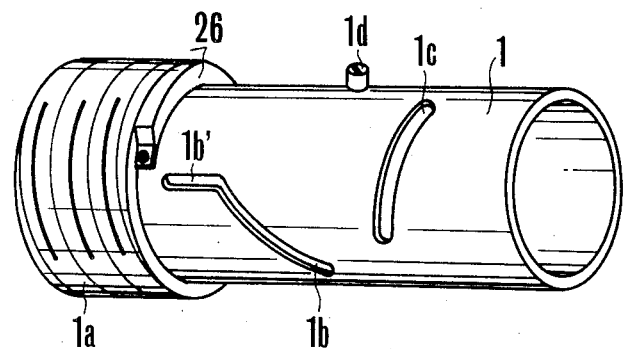
FIG. 17 is a perspective view of the tubular body of the embodiment of FIG. 16.
Figure 18:
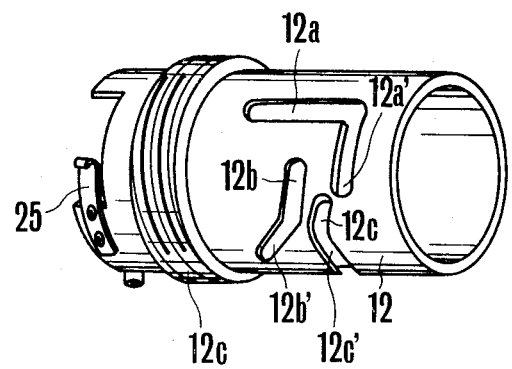
FIG. 18 is a perspective view of the cam sleeve having a spring member fixedly mounted at the end thereof.
Figure 19:
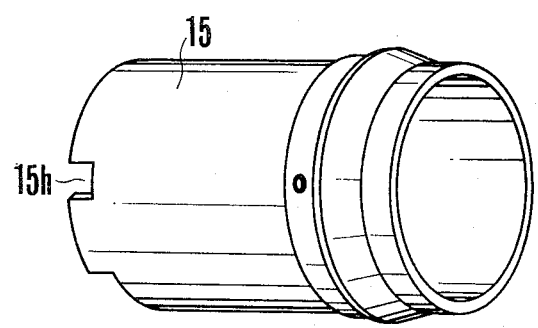
FIG. 19 is a perspective view of a contiguous sleeve having a cut-out therein.

FIG. 21 is a developed view showing the changed positions of the various parts when the actuating member is axially moved from the telephoto to the wide angle position. In the zooming range between the positions shown in FIGS. 21 and 22, only the longitudinal slot 12a of the cam member 12 is operative with pin 1d so that while the free end 25a of the spring 25 is engaged in the cut-out 15h, the cam member 12, the intermediate sleeve 15 and the actuator member 14 are moved as a unit. During focusing, the actuator member 14 and the intermediate sleeve 15 are axially moved relative to the cam member 12. However, since the pitch of the screw threads is made very fine, the influence of this movement upon the optical system will be negligible. It should be noted that the pin 27 shown in FIG. 16 is a stopper means between the cam member 12 and the actuating member 14 or the intermediate sleeve 15 during focusing. This pin 27 is fixedly mounted to the cam member 12 and positioned so as to engage in the hole 15i formed in the front end portion of the intermediate sleeve 15.

Therefore, during focusing, the pin 27 shown in FIG. 20 is movable from one end of the hole 15i to the other. Within this range, the actuating member 14 and the intermediate sleeve 15 are moved freely relative to the cam sleeve. With this angle of rotation, the focusing lens L2 is caused to axially move through a distance corresponding to the pitch of the helicoids 6a and 1a between the front barrel 6 and the tubular body 1.

When the actuating member 14 is next turned about the optical axis from the wide angle position, the member 14 and the intermediate sleeve 15 abut with the stopper pin 27 against the end of the opening 15i. Upon further rotation of the actuating member 14 about the optical axis, the pin 1d moves along the transverse guide slot 12a' and the spring member 25 will ride upon the upper part of the interconnecting plate 26 (see FIG. 22).

The rotative movement of the actuating member 14 and the intermediate member 15 about the optical axis is also transmitted by the spring member 25 to the cam member so that they turn as a unit about the optical axis. By rotation of the cam member 12 due to this connecting function, the pin 8b on the variator holder 8 is moved along the cross point of the guides 12b' and 1b' and the lens holder 8 moves in the axial direction toward the front of the lens assembly with variation of the spacing between the variator and the compensator thus effecting close-up operation.

To return from the close-up positions to the zooming positions, the actuating member 14 is turned in the reverse direction until the pin 1d reaches the changeover point of the guides 12a and 12a' shown in FIG. 21 where the spring member 25 is disengaged from the interconnecting plate 26. By axially moving the actuating member 14, the cam sleeve 12 is restricted from rotative movement about the optical axis and only the axial movement is effective to achieve zooming.

It will be seen from the foregoing that the zoom lens assembly of the invention is capable of consecutively performing zooming operation followed by close-up operation and that therefore it is superior in its manageability with a mechanism for connecting and separating the actuating means and the intermediate member when in the transit to the close-up range being simple in structure and capable of meeting the demands of the market for a low price and high quality product.

Furthermore, the magnification varying lens holding member 8 and the image shift compensating lens holding member 10, 10' can be accelerated in axial movement by engagement of the pins 8b and 8c in the guide slots 1b, 12b, 1c, 12c with the advantage that the longitudinal length of the lens assembly may be shortened to a considerable degree.

While specific embodiments of the invention have been shown and described in detail to illustrate the application of the inventive principles, it will be understood that the invention may be embodied otherwise without departing from such principles.

What is claimed is:

1. A zoom lens assembly having a single operational member adapted to selectively perform zooming operation and close-up operation comprising:
   (a) first and second lens mounting members for holding first and second lens groups movable for zooming operation with variation of image magnification while image shift is compensated for respectively;
   (b) a cylindrical member in which said first and said second lens mounting members are fitted and which has first and second guide means for guiding said first and said second lens mounting member, with third guide means being formed contiguous to said first guide means for guiding said first lens mounting member to close-up range;
   (c) an intermediate member fitted between said operational member and said cylindrical member having contiguous first and second guide means formed therein to guide said operational member either axially or transversely, said first or said second guide means being penetrated by engaging means on said cylindrical member, and having third and fourth guide means cooperative with said first guide means of said cylindrical member to control movement of said first lens mounting member;
   (d) interlocking means for said operational member and said first lens mounting member, and engaging means on said first lens mounting member extending through said first guide means of said cylindrical member to engage said third or said fourth guide means of said intermediate member so that as said operational member is actuated, said first lens mounting member is moved;

(e) drive connection means between said first lens mounting member and said second lens mounting member, one of said two lens mounting members being provided with axially elongated armed portions, the other of said lens mounting members having engaging portions for engagement with said armed portions so that motion of said first lens mounting member is transmitted to said second lens mounting member; and (f) interlocking means for close-up operation arranged upon changeover of said operational member from the zooming range to the close-up range to interlock said intermediate member and said operational member with each other in transverse directions.

2. A zoom lens assembly according to claim 1, wherein said interlocking means comprises an engaging pin provided in an opposite position to said operational member and said intermediate member, and a detent portion for engagement with said engaging pin, said operational member when changed over to close-up range being interlocked with said intermediate member.

3. A zoom lens assembly according to claim 1, wherein said third guide means of said cylindrical member is provided in axially parallel relationship therewith so that when said operational member is actuated for close-up operation, the spacing between said first and said second lens groups is varied as the first lens group is axially moved while the second lens group remains stationary at a zooming position.

4. A zoom lens assembly according to claim 1, further including means for changing over to said second guide means only when said engaging means of said cylindrical member has come to a predetermined position of said first guide means of said intermediate means.

5. A zoom lens assembly according to claim 4, including sensing means comprising:
(a) a pin positioned to face at both of said operational member and said intermediate member and urged to move in an axial direction while being supported by said cylindrical member;
(b) a recess formed in a portion of said intermediate member to engage said pin, said recess engaging said pin when said engaging means of said cylindrical member is out of a predetermined position of said first guide means of said intermediate member, said operational member being thereby incapable of performing closeup operation; and
(c) means for releasing said pin from the engagement with said recess, said means operating to take said pin out of the engagement with the recess when said operational member is changed from zooming range to close-up range.

6. A zoom lens assembly having a single operational member capable upon rotation thereof about an optical axis of said lens assembly to effect focusing of said assembly and upon axial movement thereof to effect zooming operation of said assembly, comprising:
(a) an elongated cylindrical member having first and second guide means for controlling axial movement of first and second movable lens groups contributing to a change of image magnification and to image shift compensation during zooming operation;
(b) first and second lens mounting members for containing said first movable lens group and said second movable lens group, said lens mounting members being individually fitted in the inner diameter of said cylindrical member;
(c) means for controlling the movement of said first lens mounting member by the axial movement of said single operational member, said means including a pin member radially extending from said first lens mounting member and engaging in said first guide means so that it is controlled by said first guide means;
(d) means for controlling the movement of said second lens mounting member by said first lens mounting member, said controlling means comprising arms axially extending from one of said two lens mounting members to engage respective cutouts formed in the other of said lens mounting members in surface-contacting relation, said first lens mounting member being adapted to be axially moved while turned about said optical axis to impart rotative motion to said second lens mounting member;
(e) an intermediate member arranged between said cylindrical member and said operational member, said intermediate member being provided with axially elongated first guide means and second guide means inclined with respect to said optical axis, with engagement means extending radially from said cylindrical member passing through said first guide means of said intermediate member and with engagement means extending radially from said first lens mounting member passing through said second guide means of said intermediate member after having passed through said first guide means of said cylindrical member so that said first lens mounting member is accelerated in axial movement of the combined action of both guide means of said intermediate and said cylindrical members; and
(f) means for controlling movement of said second lens mounting member comprising engagement means extending radially from said second lens mounting member and said second guide means of said cylindrical member, with said engagement means engaging in said second guide means to control movement of said second lens mounting member.

7. A zoom lens assembly having a single operational member adapted to selectively perform zooming operation and closeup operation including
(a) first and second lens mounting members for holding first and second lens groups movable for zooming operation with variation of image magnification while the image shift is compensated respectively;
(b) a cylindrical member in which said first and said second lens mounting members are fitted;
(c) a third lens mounting member for holding a third lens movable for focusing; and
(d) first guide means responsive to said operational member for axially moving said third lens mounting member to effect focusing, said zoom lens assembly comprising:
(A) an intermediate member fitted in a space between said cylindrical member and said operational member; said intermediate member having second guide means for guiding said single operational member responsive to zooming operation and closeup operation, and third and fourth guide means for guiding said first and second lens mounting members responsive to zooming operation and closeup operation;

(B) interlocking means for interlocking said operational member and said intermediate member, said interlocking means being interlocked when said operational member is operated beyond the normal focusing range toward the closeup operating range;

(C) fifth guide means for changing the distance between said first and second lens mounting members in response to closeup operation of said operational member, said fifth guide means being formed continuously with at least one of said third and fourth guide means, at least one of said lens groups being shifted to the closeup direction when said interlocking means is made effective and said intermediate member is guided in proportional relationship with said fifth guide means.

8. A zoom lens assembly according to claim 7 or 1, wherein said interlocking means comprises:
(a) a spring member affixed to said intermediate member; and
(b) an interconnecting plate affixed to said cylindrical member, and arranged so that the movement of said operational member to one terminal end of the zooming range is followed by a rotative movement thereof, said spring member riding thereon to interlock said intermediate member and said operational member.

* * * * *